United States Patent
Bushey et al.

(10) Patent No.: US 7,580,837 B2
(45) Date of Patent: Aug. 25, 2009

(54) SYSTEM AND METHOD FOR TARGETED TUNING MODULE OF A SPEECH RECOGNITION SYSTEM

(75) Inventors: Robert R. Bushey, Cedar Park, TX (US); Benjamin Anthony Knott, Round Rock, TX (US); John Mills Martin, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 799 days.

(21) Appl. No.: 10/917,233

(22) Filed: Aug. 12, 2004

(65) Prior Publication Data

US 2006/0036437 A1     Feb. 16, 2006

(51) Int. Cl.
G10L 15/06 (2006.01)
G10L 15/04 (2006.01)
G10L 15/18 (2006.01)
G10L 11/00 (2006.01)
G06F 17/27 (2006.01)

(52) U.S. Cl. .................. 704/244; 704/9; 704/251; 704/257; 704/270

(58) Field of Classification Search .............. 704/231
See application file for complete search history.

(56) References Cited

U.S. PATENT DOCUMENTS

| | | |
|---|---|---|
| 4,953,204 A | 8/1990 | Cuschelg, Jr. et al. |
| 4,967,405 A | 10/1990 | Upp et al. |
| 5,335,269 A | 8/1994 | Steinlicht |
| 5,455,903 A | 10/1995 | Jolissaint et al. |
| 5,497,373 A | 3/1996 | Hulen et al. |
| 5,522,046 A | 5/1996 | McMillen et al. |
| 5,530,744 A | 6/1996 | Charalambous et al. |
| 5,555,299 A | 9/1996 | Maloney et al. |
| 5,590,186 A | 12/1996 | Liao et al. |
| 5,652,789 A | 7/1997 | Miner et al. |

(Continued)

FOREIGN PATENT DOCUMENTS

EP     0 424 015 A2     4/1991

(Continued)

OTHER PUBLICATIONS

U.S. Appl. No. 10/898,722, filed Jul. 23, 2004.

(Continued)

*Primary Examiner*—David R Hudspeth
*Assistant Examiner*—Brian L Albertalli
(74) *Attorney, Agent, or Firm*—Toler Law Group

(57) ABSTRACT

A system and method are disclosed for targeted tuning of a speech recognition system. A method incorporating teachings of the present disclosure may include deploying a speech recognition module to apply an appropriate interpretation to a plurality of utterance types. The method may also include accessing information representing a collection of recorded utterances and assigned interpretation for each of the plurality of recorded utterances. The assigned interpretation for each of the plurality of recorded utterances may then be compared to an accurate interpretation for each of the plurality of utterance, and a separate accuracy value may be determined for each of the plurality of utterance types. With some implementations, if the separate accuracy value for a given type of utterance is too low, a selection of utterances having the given type may be used to tune the speech recognition module.

26 Claims, 3 Drawing Sheets

U.S. PATENT DOCUMENTS

| | | |
|---|---|---|
| 5,754,639 A | 5/1998 | Flockhart et al. |
| 5,754,978 A | 5/1998 | Perez-Mendez et al. |
| 5,867,817 A | 2/1999 | Catallo et al. |
| 5,923,745 A | 7/1999 | Hurd |
| 5,937,051 A | 8/1999 | Hurd et al. |
| 5,940,476 A | 8/1999 | Morganstein et al. |
| 5,946,388 A | 8/1999 | Walker et al. |
| 5,953,704 A | 9/1999 | McIlroy et al. |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,049,594 A | 4/2000 | Furman et al. |
| 6,118,866 A | 9/2000 | Shtivelmann |
| 6,119,101 A | 9/2000 | Peckover |
| 6,173,266 B1 | 1/2001 | Marx et al. |
| 6,173,289 B1 | 1/2001 | Sonderegger et al. |
| 6,173,399 B1 | 1/2001 | Gilbrech |
| 6,175,621 B1 | 1/2001 | Begeja |
| 6,259,786 B1 | 7/2001 | Gisby |
| 6,260,014 B1 * | 7/2001 | Bahl et al. ................... 704/254 |
| 6,269,153 B1 | 7/2001 | Carpenter et al. |
| 6,317,439 B1 | 11/2001 | Cardona et al. |
| 6,333,980 B1 | 12/2001 | Hollatz et al. |
| 6,353,608 B1 | 3/2002 | Cullers et al. |
| 6,366,658 B1 | 4/2002 | Bjornberg et al. |
| 6,366,668 B1 | 4/2002 | Borst et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,414,966 B1 | 7/2002 | Kulkarni et al. |
| 6,418,424 B1 | 7/2002 | Hoffberg et al. |
| 6,442,247 B1 | 8/2002 | Garcia |
| 6,510,414 B1 | 1/2003 | Chaves |
| 6,519,562 B1 | 2/2003 | Phillips et al. |
| 6,529,871 B1 | 3/2003 | Kanevsky et al. |
| 6,553,113 B1 | 4/2003 | Dhir et al. |
| 6,570,967 B2 | 5/2003 | Katz |
| 6,584,180 B2 | 6/2003 | Nemoto |
| 6,587,556 B1 | 7/2003 | Judkins et al. |
| 6,598,136 B1 | 7/2003 | Norrod et al. |
| 6,600,736 B1 | 7/2003 | Ball et al. |
| 6,603,854 B1 | 8/2003 | Judkins et al. |
| 6,614,781 B1 | 9/2003 | Elliott et al. |
| 6,631,186 B1 | 10/2003 | Adams et al. |
| 6,678,360 B1 | 1/2004 | Katz |
| 6,678,718 B1 | 1/2004 | Khouri et al. |
| 6,690,788 B1 | 2/2004 | Bauer et al. |
| 6,694,012 B1 | 2/2004 | Posthuma |
| 6,697,460 B2 | 2/2004 | Knott et al. |
| 6,700,972 B1 | 3/2004 | McHugh et al. |
| 6,704,404 B1 | 3/2004 | Burnett |
| 6,707,789 B1 | 3/2004 | Arslan et al. |
| 6,714,631 B1 | 3/2004 | Martin et al. |
| 6,721,416 B1 | 4/2004 | Farrell |
| 6,731,722 B2 | 5/2004 | Coffey |
| 6,738,473 B1 | 5/2004 | Burg et al. |
| 6,744,861 B1 | 6/2004 | Pershan et al. |
| 6,744,877 B1 | 6/2004 | Edwards |
| 6,751,306 B2 | 6/2004 | Himmel et al. |
| 6,757,306 B1 | 6/2004 | Klish, II et al. |
| 6,766,320 B1 | 7/2004 | Wang et al. |
| 6,775,359 B1 | 8/2004 | Ron et al. |
| 6,778,643 B1 | 8/2004 | Bushey et al. |
| 6,792,096 B2 | 9/2004 | Martin et al. |
| 6,807,274 B2 | 10/2004 | Joseph et al. |
| 6,823,307 B1 | 11/2004 | Steinbiss et al. |
| 6,831,932 B1 | 12/2004 | Boyle et al. |
| 6,832,224 B2 | 12/2004 | Gilmour |
| 6,842,504 B2 | 1/2005 | Mills et al. |
| 6,847,711 B2 | 1/2005 | Knott et al. |
| 6,853,722 B2 | 2/2005 | Joseph et al. |
| 6,853,966 B2 | 2/2005 | Bushey et al. |
| 6,859,529 B2 | 2/2005 | Duncan et al. |
| 6,871,212 B2 | 3/2005 | Khouri et al. |
| 6,879,683 B1 | 4/2005 | Fain et al. |
| 6,885,734 B1 | 4/2005 | Eberle et al. |
| 6,891,932 B2 | 5/2005 | Bhargava et al. |
| 6,895,083 B1 | 5/2005 | Bers et al. |
| 6,901,366 B1 | 5/2005 | Kuhn et al. |
| 6,907,119 B2 | 6/2005 | Case et al. |
| 6,915,246 B2 | 7/2005 | Gusler et al. |
| 6,925,432 B2 * | 8/2005 | Lee et al. ........................ 704/5 |
| 6,963,983 B2 | 11/2005 | Munson et al. |
| 7,003,079 B1 * | 2/2006 | McCarthy et al. ......... 379/32.01 |
| 7,006,605 B1 | 2/2006 | Morganstein et al. |
| 7,031,444 B2 | 4/2006 | Shen et al. |
| 7,035,388 B2 | 4/2006 | Kurosaki et al. |
| 7,092,888 B1 * | 8/2006 | McCarthy et al. ............ 704/277 |
| 7,103,542 B2 * | 9/2006 | Doyle ......................... 704/231 |
| 7,197,130 B2 | 3/2007 | Paden et al. |
| 7,346,507 B1 * | 3/2008 | Natarajan et al. ............ 704/244 |
| 7,356,475 B2 | 4/2008 | Novack et al. |
| 7,379,867 B2 * | 5/2008 | Chelba et al. ................ 704/236 |
| 2001/0011211 A1 | 8/2001 | Bushey et al. |
| 2001/0018672 A1 | 8/2001 | Petters et al. |
| 2001/0021948 A1 | 9/2001 | Khouri et al. |
| 2001/0032229 A1 | 10/2001 | Hulls et al. |
| 2001/0034662 A1 | 10/2001 | Morris |
| 2002/0046030 A1 | 4/2002 | Haritsa et al. |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0067714 A1 | 6/2002 | Crain et al. |
| 2002/0087385 A1 | 7/2002 | Vincent |
| 2002/0114432 A1 | 8/2002 | Shaffer et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0156699 A1 | 10/2002 | Gray et al. |
| 2002/0165732 A1 | 11/2002 | Ezzeddine et al. |
| 2002/0196277 A1 | 12/2002 | Bushey et al. |
| 2003/0026409 A1 | 2/2003 | Bushey et al. |
| 2003/0035381 A1 | 2/2003 | Chen et al. |
| 2003/0035516 A1 | 2/2003 | Guedalia |
| 2003/0069937 A1 | 4/2003 | Khouri et al. |
| 2003/0097428 A1 | 5/2003 | Afkhami et al. |
| 2003/0103619 A1 | 6/2003 | Brown et al. |
| 2003/0114105 A1 | 6/2003 | Haller et al. |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmins et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0195753 A1 | 10/2003 | Homuth |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0235287 A1 | 12/2003 | Margolis |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |

| | | |
|---|---|---|
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015744 A1 | 1/2005 | Bushey et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131708 A1* | 6/2005 | Palma et al. .................. 704/275 |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0169441 A1 | 8/2005 | Yacoub et al. |
| 2005/0169453 A1 | 8/2005 | Knott et al. |
| 2005/0201547 A1 | 9/2005 | Burg et al. |
| 2005/0240411 A1 | 10/2005 | Yacoub |
| 2006/0177040 A1 | 8/2006 | Mitra et al. |
| 2006/0291642 A1 | 12/2006 | Bushey et al. |
| 2007/0041551 A1 | 2/2007 | Whitecotten et al. |
| 2007/0047720 A1 | 3/2007 | Brandt et al. |
| 2007/0116230 A1 | 5/2007 | Brandt et al. |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/975,023, filed Oct. 27, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.
Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.

* cited by examiner

SYSTEM AND METHOD FOR TARGETED TUNING MODULE OF A SPEECH RECOGNITION SYSTEM

FIELD OF THE INVENTION

The present invention is generally related to speech-enabled applications, and more specifically to a system and method for targeted tuning of a speech recognition system.

BACKGROUND

Many speech solutions, such as speech-enabled applications and speech recognition systems, utilize a computing device to "listen" to a user utterance and to interpret that utterance. Depending upon design considerations, a speech solution may be tasked with accurately recognizing a single user's utterances. For example, a dictation-focused solution may need to be highly accurate and tuned to a given user. In other applications, a system designer may want a speech solution to be speaker-independent and to recognize the speech of different users, provided the users are speaking in the language the application is designed to understand and uttering phrases associated with the application.

In practice, a user utterance may be "heard" by a computing device and may be broken into pieces. Individual sounds and/or a collection of individual sounds may be identified and matched to a predefined list of sounds, words, and/or phrases. The complex nature of translating raw audio into discrete pieces and matching the audio to some pre-defined profile often involves a great deal of signal processing and may, in some instances, be performed by a speech recognition (SR) engine executing on a given computing system.

While SR engines may be relatively accurate, these engines and other speech solution components often require tuning. In practice, a system's recognition rate at implementation may be unacceptably low. This recognition rate may be improved through tuning. However, conventional approaches to tuning may be costly in both time and money. Moreover, the effectiveness of conventional tuning approaches is often difficult to quantify and predict. As such, a system administrator may engage in several tuning cycles without producing significant improvements in the deployed system's recognition rate.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DESCRIPTION

Embodiments discussed below focus on the tuning of a deployed speech recognition system. Though the following discussions focus on this implementation of the teachings, the teachings may be applied in other circumstances as well.

Although certain embodiments are described using specific examples, it will be apparent to those skilled in the art that the invention is not limited to these few examples. Accordingly, the present invention is not intended to be limited to the specific form set forth herein, but on the contrary, it is intended to cover such alternatives, modifications, and equivalents, as can be reasonably included within the spirit and scope of the disclosure.

From a high level, one technique for providing targeted tuning of a speech-enabled system may include deploying a speech recognition module to interpret a plurality of utterance types. The technique may also include accessing information representing a collection of recorded utterances and an indication of how each of the recorded utterances was interpreted by the speech recognition module. The assigned interpretations may be compared to accurate interpretations, and a separate accuracy value may be determined for each of the plurality of utterance types. With some implementations, if the accuracy value for a given type of utterance is too low, a selection of utterances having the given type may be used to tune the speech recognition module.

In effect, a deployed speech recognition system may be tuned to better recognize the specific words and/or phrases that give the system difficulties. Similarly, if a deployed system has an acceptable recognition rate for certain utterances, those utterances may be exempted from additional tuning—helping to protect those utterances that enjoy an acceptable recognition rate from inadvertent recognition rate degradation.

Targeting the tuning efforts on problematic utterances may help reduce system-tuning costs. Moreover, the effectiveness of the targeted tuning approach may prove easier to quantify and/or predict—allowing a system administrator to produce recognizable improvements in the deployed system's overall recognition rate by focusing on specific areas of concern.

Figure 1:
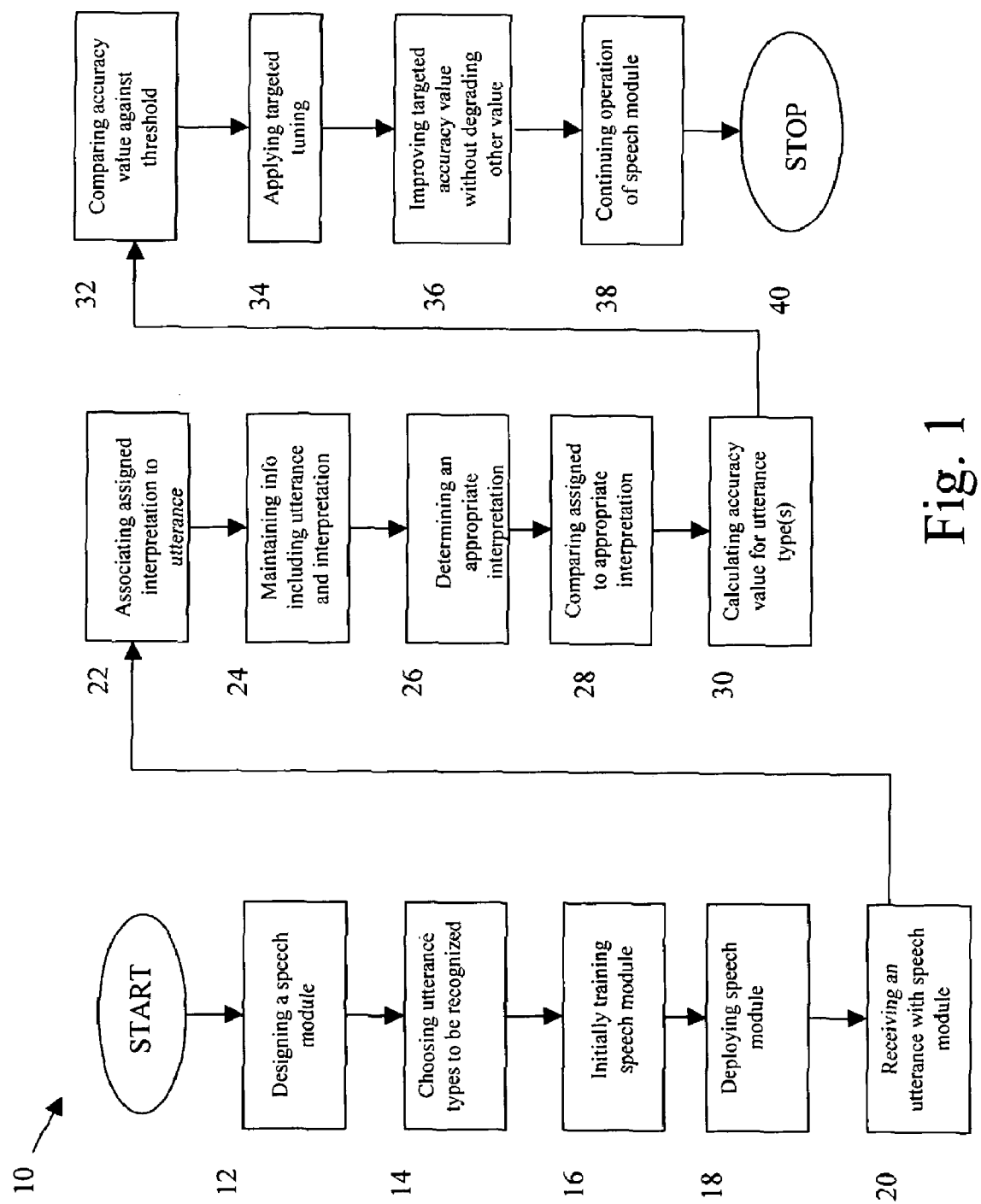
FIG. 1 presents a flow diagram for providing targeted speech solution tuning in accordance with the teachings of the present disclosure.

As mentioned above, FIG. 1 presents a flow diagram for providing targeted speech solution tuning in accordance with the teachings of the present disclosure. Technique 10 of FIG. 1 may begin with designing a speech module as indicated at step 12. The process of designing the module may include, for example, making decisions as to whether the to-be-deployed system will be speaker-dependant, speaker-independent, capable of recognizing words and/or phrases, designed to recognize a broad range of utterance types, a limited range of utterance types, etc.

In one embodiment, a to-be-deployed speech recognition system may be designed to be speaker-independent and to recognize utterance types that include several different action requests. Depending upon implementation detail, an action request may be a single word, a phrase, a sentence, etc. In one embodiment, an action request may be an Action-Object request, which may include a statement indicating an action to be taken and an object related to that action. For example, a bill-paying request includes a "Pay" action coupled with a "Bill" object. Other Action-Object requests may include, for example, inquire balance, change service, acquire service, cancel service, inquire bill, inquire account, schedule payment, and reconnect service.

At step 14, utterance types to be recognized may be selected, and the speech module may be initially trained at step 16. In a speaker-independent system, thousands of speech samples from many people may be considered in an effort to develop a profile for expected utterances. The profile may represent, for example, a derived "average" caller profile. The samples may, for example, be collected from actual deployed speech applications and/or purchased as pre-recorded samples of people uttering the expected phrases in a phonetically balanced American English or other appropriate language/dialect.

At step 18, the speech module may be deployed into a live environment. The environment may be, for example, a call center application. At step 20, the speech module may receive an utterance. An incoming signal may represent the utterance and may be digitized for further manipulation. In practice, the speech module may digitize the incoming speech signal and calculate utterance parameters.

At step 22, the system may compare the utterance parameters to a "library" of known and/or expected phrases and attempt to find the best match—associating an assigned interpretation to the utterance. Depending upon earlier design considerations, the system may, for example, perform "whole word" recognition and/or sub-word recognition like "phonetic recognition." In some cases, the system may or may not be capable of finding a match and/or assigning an interpretation. If an interpretation is assigned, the assigned interpretation may or may not be accurate.

At step 24, information associated with a call may be maintained. The information may include, for example, a recording of a received utterance, an indication of whether an interpretation was made, an indication of what interpretation was made, an utterance receipt time, an indication of whether the assigned interpretation was accurate, etc. In practice, an utterance recording may be saved as a discrete audio file, having a format such as a WAV format, an MP3 format, an AU format, or a MIDI format.

At step 26, the deployed system, the speech module, and/or some other system or individual may consider a previously received utterance and independently assign an "appropriate" interpretation to the utterance. The appropriate interpretation may be compared against the assigned interpretation at step 28 to determine how well the speech module is operating.

In some embodiments, an independent accuracy value may be calculated for at least one utterance type at step 30. The independent accuracy value may effectively indicate how well a speech module is "recognizing" a given utterance type. The accuracy value may be based on a single criteria or a combination of criteria such as recognition rates, hits, misses, etc., for a specific utterance type. However determined, it may become apparent that a speech-enabled system more accurately responds to a first type of utterance and has a more difficult time with a second type of utterance. For example, a system may recognize an action like "pay bill" with an acceptable level of accuracy and may not recognize an action like "transfer to agent" with an acceptable level of accuracy. As such, an administrator and/or tuning application may elect to apply targeted tuning to the speech system to improve recognition of the second type of utterance.

One example methodology for calculating an accuracy value could include, for example, calculating a hit rate value and a false alarm value for a given utterance type. In practice, the accuracy value may include or represent one or more of these and/or other values. The methodology may also include determining a frequency value for the given utterance type. An administrator may want to know, for example, how "important" an utterance type is. If an utterance type represents less than one percent of the received utterances, an administrator may determine that the utterance type does not warrant additional tuning. The importance threshold may be a predefined value and/or importance threshold level decisions may be made on a more ad hoc basis.

Similarly, an administrator may set a threshold value for an accuracy value, a hit rate value, a false alarm value, etc. Again, the threshold values may be pre-set or adjusted in an ad hoc manner. As mentioned above, an assigned accuracy value may be compared at step 32 against a threshold value to determine if a system needs tuning. In accordance with one aspect of the present disclosure, a system administrator and/or a tuner may determine that a specific utterance type recognition rate is too low and elect to use a tuning application at step 34 to improve the system recognition rate. Operationally, the tuning application may initiate the accessing of interpretive information that represents a received utterance and an assigned interpretation. For example and as mentioned above, a given system may maintain a historical record of its own performance. The record may include, for example, recordings of received utterances and system assigned interpretations for each of the received utterances.

A given tuning application may access an appropriate interpretation for each of the received utterances. The appropriate interpretation may represent a more accurate interpretation of an utterance and may be generated by the tuning application and/or by an entity separate from the tuning application. The application may then begin targeted tuning, which may involve, for example, feeding a collection of one type of utterance into a learning module. In one embodiment, the process of feeding the learning module may include playing one or more files that represent recordings of an utterance type while also inputting an appropriate interpretation for the recordings.

At step 36, improving recognition of one type of utterance may occur without degrading recognition of other types of utterances. This objective may be facilitated, for example, by attempting to avoid the feeding of non-targeted utterance types into the learning module. At step 38, operation of the speech module may be continued, and a future date may be selected for calculating the effectiveness of the targeted tuning. Technique 10 may then progress to stop at step 40.

The various steps of technique 10 may be amended, altered, added to, removed, looped, etc. without departing from the spirit of the teachings. Moreover, a single entity and/or a combination of entities may perform steps of technique 10. For example, some of the steps may be performed in connection with an automated call router, a voice activated services platform, a call center, and/or some other operational environment.

Figure 2:
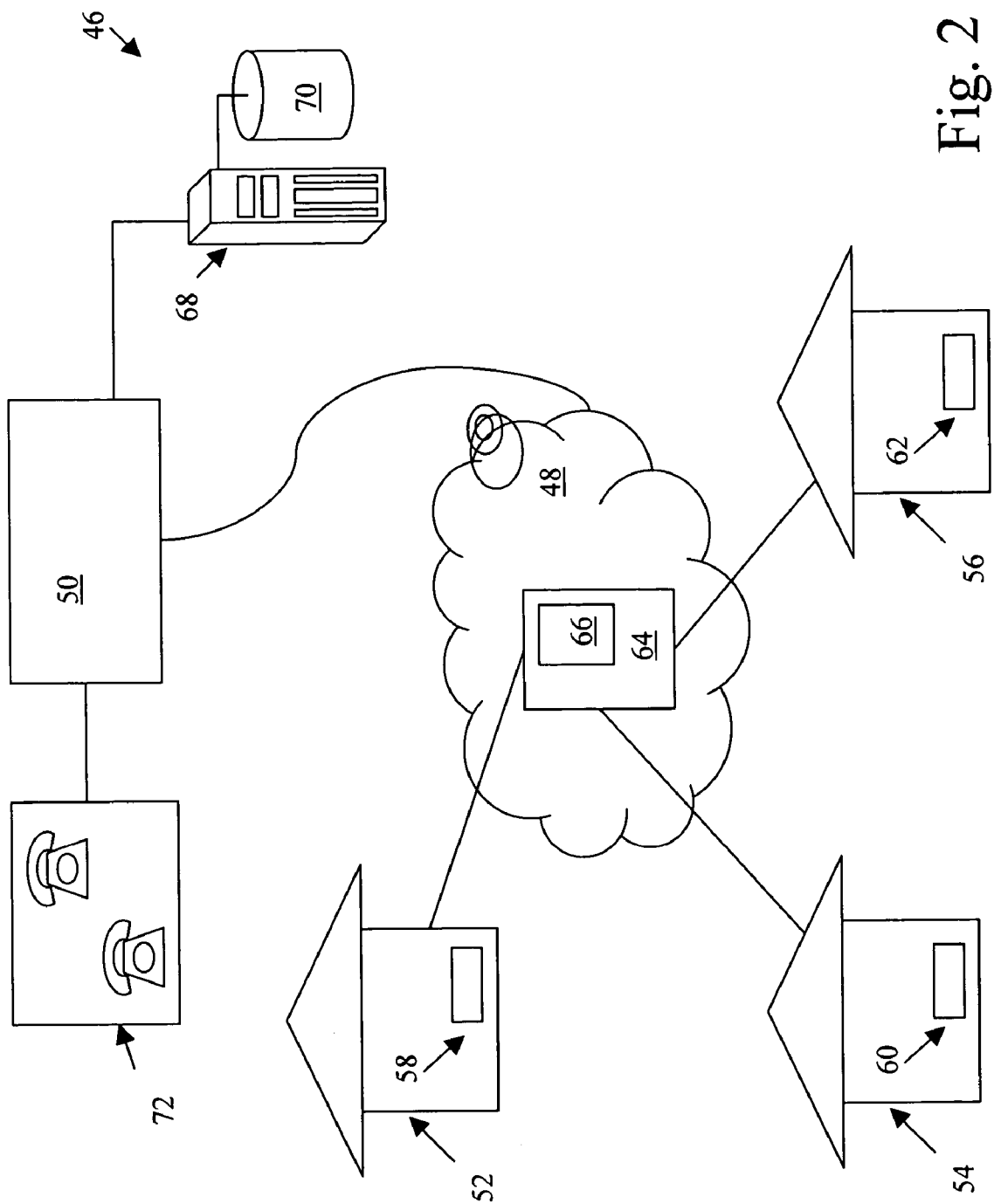
FIG. 2 shows one embodiment of a speech-enabled system that incorporates teachings of the present disclosure.

As mentioned above, FIG. 2 shows one embodiment of a speech-enabled system 46 that incorporates teachings of the present disclosure. In practice, a communication network 48, which may be a Public Switched Telephone Network (PSTN), a cable network, an Internet, an intranet, an extranet, or some other network capable of carrying voice traffic, may be communicatively coupled to a speech system 50. A caller from a location, such as location 52, 54, and/or 56, may place a call to system 50 in an effort to receive, for example, information and/or some form of customer service.

A caller may use a communication device, such as device 58, 60, or 62 to link to a node 64 of network 48. Devices 58, 60, and 62 may be, for example, POTS telephones, voice over IP telephones, computers, cellular telephones, wireless devices, and/or some other device capable of initiating the communication of information via a network.

Depending upon the architecture of network 48, incoming communications may be multiplexed, converted from a circuit switched communication to a packet switched communication, converted from text to speech, and/or other types of call modifications at interface 66 before the communication is passed on to system 50.

As depicted, system 50 may include a computing platform 68 and a repository 70 storing a sample of utterances received by system 50. In practice, platform 68 may perform speech recognition functions. Platform 68 may receive a verbal communication via network 48 and process the communication in an effort to properly interpret the communication. The communication itself, as well as an assigned interpretation may be captured and saved in repository 72. Additional information may also be stored in repository 70. Additional information may be call-related and may include information, such as call time, call duration, calling party number, caller language, etc.

Figure 3:
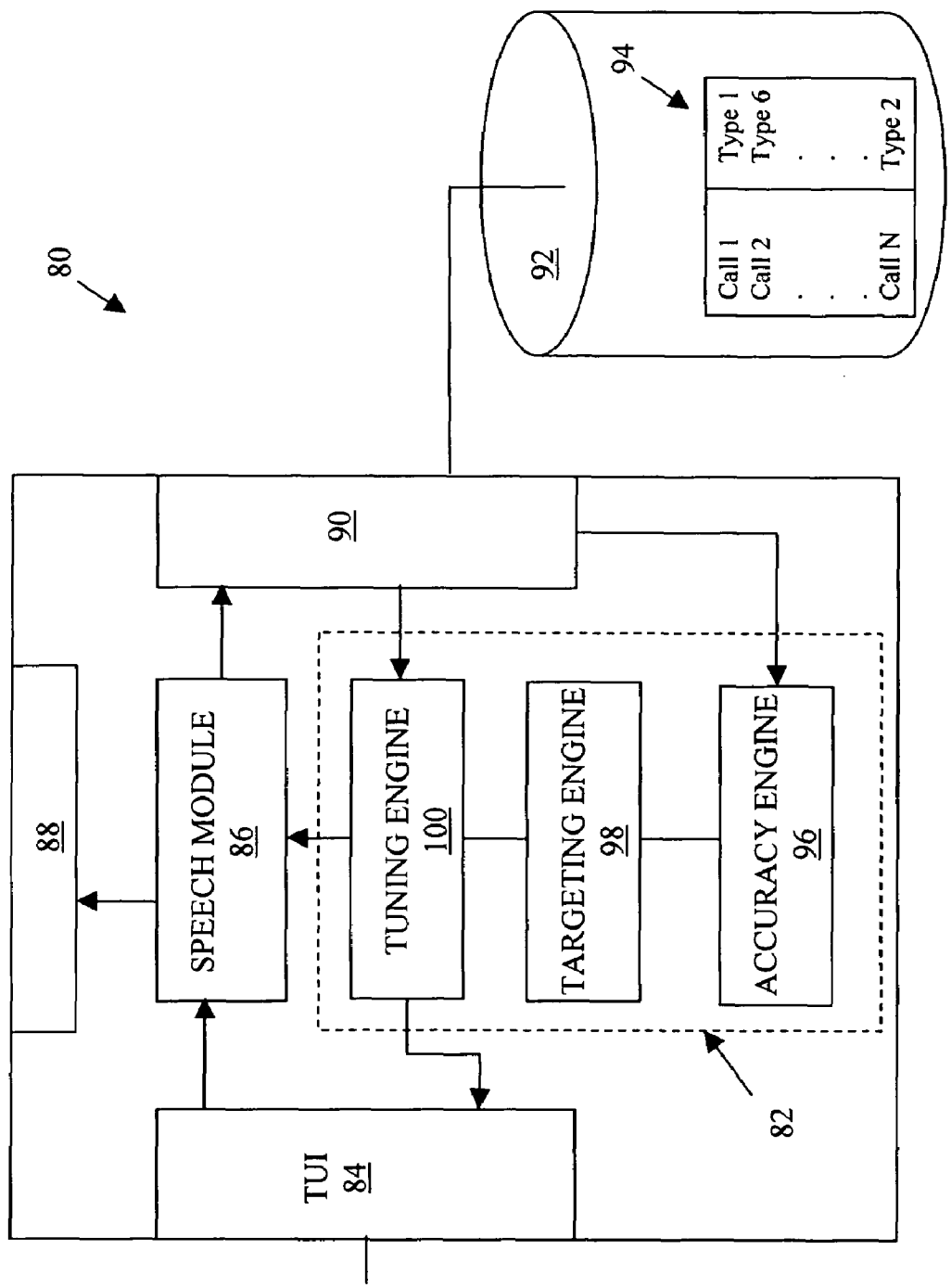
FIG. 3 presents a high-level block diagram of speech-enabled system incorporating a training tool in accordance with the teachings of the present disclosure.

In some cases, platform 68 may assist in interpreting an utterance as a request to speak with an agent. In such a situation, platform 68 may direct a component of system 50 to route a caller to a help desk operator at call center 72. System 50 may take several forms. For example, system 50 may be an integrated solution—including multiple features and capabilities in a single device, having a common housing. System 50 may also take on a more decentralized architecture—where devices and functions are located remote from one another. An example of a relatively centralized system is depicted in FIG. 3.

As mentioned above, FIG. 3 presents a high-level block diagram of a speech-enabled system 80 incorporating a training tool subsystem 82 in accordance with the teachings of the present disclosure. In operation of system 80, an utterance may be received via Telephone User Interface (TUI) 84. The utterance may be passed to speech module 86, which may act as a speech recognition engine and assign an utterance type to the utterance. Speech module 86 may also include logic that makes a call routing and/or a call response decision based at least partially upon the assigned utterance type. Effectuating the decision of speech module 86 may be facilitated in some cases by interface 88.

In practice, a recording of the utterance and an assigned utterance type for the call may be communicated via interface 90 to repository 92. The recording, assigned utterance type, and other call related information may be stored in a table 94 or other structured and searchable information store.

In some embodiments, accuracy engine 96 may periodically query repository 92 for information maintained in table 94. Accuracy engine 96 may use retrieved information to determine if an assigned utterance type for a given captured utterance represents an accurate interpretation of the given captured utterance. Information representing accuracy engine 96's analysis may be transferred to targeting engine 98. Targeting engine 98 may use the analysis to help determine an accuracy level of system 80 in identifying a first type of utterance and another accuracy level of system 80 in identifying a second type of utterance. Targeting engine 98 may also include logic that compares a calculated accuracy value for one or more utterance types against a threshold or acceptable accuracy level. If an utterance type suffers from an unacceptably low accuracy value, targeting engine 98 may output an indicator informing subsystem 82 of a need to train system 80 on that particular utterance type.

In some embodiments, a system, such as system 80 may include an integrated tuning engine 100. Tuning engine 100 may recognize the indicator output by targeting engine 98, and begin tuning system 80 to better recognize the utterance type that is causing system 80 difficulties. In practice, tuning engine 100 may feed speech module 86 with a collection of utterances having a first type if the first type accuracy level is too low. The collection of utterances may, in some embodiments, include actual captured utterances stored in repository 92. In some embodiments, tuning engine 100 may take the necessary steps to avoid feeding other utterance types to speech module 86.

Though the various engines and components of system 80 and subsystem 82 are depicted as independent blocks, many of the features could be combined and/or further separated. In some embodiments, one or more of the depicted components may be embodied in software that executes on a computing platform. For example, a computer-readable medium may include a set of instructions embodying the accuracy engine, the targeting engine, and the tuning engine. Moreover, one or more aspects of system 80 may be associated with an automated call router, a voice activated services platform, a call center, and/or some other operational computing system that interacts with a caller.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A method of tuning a speech system comprising:

accessing, from a database, information representing a plurality of utterances for at least one speech-enabled application, the plurality of utterances comprising at least a first type of utterance and a second type of utterance;

accessing, from the database, interpretive information representing an assigned interpretation for at least a portion of the plurality of utterances;

determining, by a training tool subsystem, an appropriate interpretation for the portion of the plurality of utterances;

comparing, by the training tool subsystem, the assigned interpretation for the portion of the plurality of utterances to the appropriate interpretation for the portion of the plurality of utterances;

determining, by the training tool subsystem, a frequency value for the second type of utterance that represents the percentage of occurrence of the second type of utterance in the plurality of utterances;

determining, by the training tool subsystem, that the speech-enabled application more accurately responds to the first type of utterance; and electing, by the training tool subsystem, to apply a targeted tuning to the speech-enabled application to improve recognition of the second type of utterance when the frequency value for the second type of utterance is greater than a frequency threshold value.

2. The method of claim 1, further comprising tuning the speech-enabled application to improve recognition of the second type of utterance by feeding a collection of the second type of utterances into a learning module of the speech-enabled application.

3. The method of claim 2, wherein the tuning step comprises avoiding a feeding of the first type of utterances into the learning module.

4. The method of claim 2, wherein feeding the collection of the second type of utterances into the learning module comprises:
   playing a file representing a second type of utterance recording; and
   inputting the appropriate interpretation for the recording.

5. The method of claim 1, further comprising improving recognition of the second type of utterance without degrading recognition of the first type of utterance.

6. The method of claim 1, wherein the speech-enabled application executes at an automated call router.

7. The method of claim 1, wherein the speech-enabled application executes at a voice activated services platform.

8. The method of claim 1, wherein the speech-enabled application executes in connection with a call center.

9. The method of claim 1, wherein the assigned interpretation comprises an action to be performed.

10. The method of claim 9, wherein the action-object to be performed is selected from a group consisting of a pay bill action, a transfer to agent action, an inquire about balance action, a change service action, an acquire service action, a cancel service action, an inquire about a bill action, an acquire about an account action, a schedule payment action, a reconnect service action, and another business-related combination of an action and an object to be acted upon in accordance with the action.

11. The method of claim 1, wherein the plurality of utterances comprises an accumulation of utterances received via a deployed speech-enabled application, further wherein the portion of the plurality of utterances comprises all of the accumulation of utterances.

12. The method of claim 1, further comprising storing information representing the plurality of utterances as discrete audio files.

13. The method of claim 1, wherein the at least one speech-enabled application comprises an application deployed in an operational environment.

14. The method of claim 1, wherein determining that the speech-enabled application more accurately responds to the first type of utterance comprises:
   calculating a system hit rate for the first type of utterance, wherein the system hit rate for the first type of utterance reflects how often the at least one speech-enabled application applied a first type interpretation to a received first type utterance; and
   calculating a system hit rate for the second type of utterance.

15. The method of claim 1, farther comprising calculating a system error rate for the first type of utterance, wherein the system error rate for the first type of utterance reflects how often the at least one speech-enabled application misapplies a first type interpretation to a received utterance of a type other than the first type of utterance.

16. The method of claim 1, farther comprising setting an utterance type-specific hit rate design threshold for each of a collection of expected utterance types, wherein the targeted tuning comprises exclusively tuning the speech-enabled application to utterance types having an actual utterance type specific hit rate that fails to reach a respective utterance type-specific hit rate design threshold.

17. A speech tuning system, comprising:
   a repository comprising a memory to store a sample of captured utterances from an implemented speech-enabled application and an assigned utterance type for each of the captured utterances;
   an accuracy engine communicatively coupled to the repository and operable to determine if an assigned utterance type for a given captured utterance represents an accurate interpretation of the given captured utterance;
   a targeting engine communicatively coupled to the accuracy engine and operable to determine a first accuracy level of the speech-enabled application in identifying a first type of utterance and a second accuracy level of the speech-enabled application in identifying a second type of utterance; and
   a tuning engine operable to feed the speech-enabled application with a collection of utterances having the first type when the first accuracy level is lower than the second accuracy level and when a frequency of occurrence of the first type of utterance in the sample of captured utterances is greater than a frequency threshold value.

18. The system of claim 17, wherein the sample of captured utterances comprises the collection of utterances.

19. The system of claim 17, further comprising a call center that comprises the implemented speech-enabled application.

20. The system of claim 17, further comprising a computer readable medium, wherein a set of instructions embodying the accuracy engine and the tuning engine are stored on the computer readable medium.

21. The system of claim 17, further comprising an automated call router that comprises the implemented speech-enabled application.

22. The system of claim 17, further comprising a voice activated services platform that comprises the implemented speech-enabled application.

23. A method of tuning a speech-enabled application comprising:
   deploying a speech-recognition module to apply an appropriate interpretation to a plurality of utterance types;
   accessing, from a database, information representing a collection of recorded utterances and assigned interpretation for each of the plurality of recorded utterances;
   comparing, by an accuracy engine, the assigned interpretation for each of the plurality of recorded utterances to an accurate interpretation for each of the plurality of utterances;
   determining, by the accuracy engine, a separate accuracy value for each of the plurality of utterance types; and
   feeding the speech-recognition module with a selection of utterances having a given type when the separate accuracy value for the given type is lower than an accuracy threshold value and when a frequency of occurrence of the given type of utterance in the plurality of recorded utterances is greater than a frequency threshold value.

24. The method of claim 23, further comprising recording the collection of recorded utterances as discrete audio files.

25. The method of claim 23, further comprising ensuring that the selection of utterances does not include a different utterance type if the separate accuracy value for the different utterance type is at or above the accuracy threshold value.

26. The method of claim 25, further comprising determining a new accuracy value for the given type of utterance.

* * * * *